Nov. 14, 1939.   A. R. THOMPSON   2,179,529
PEAR PREPARATION MACHINE
Filed Dec. 18, 1936   10 Sheets-Sheet 1
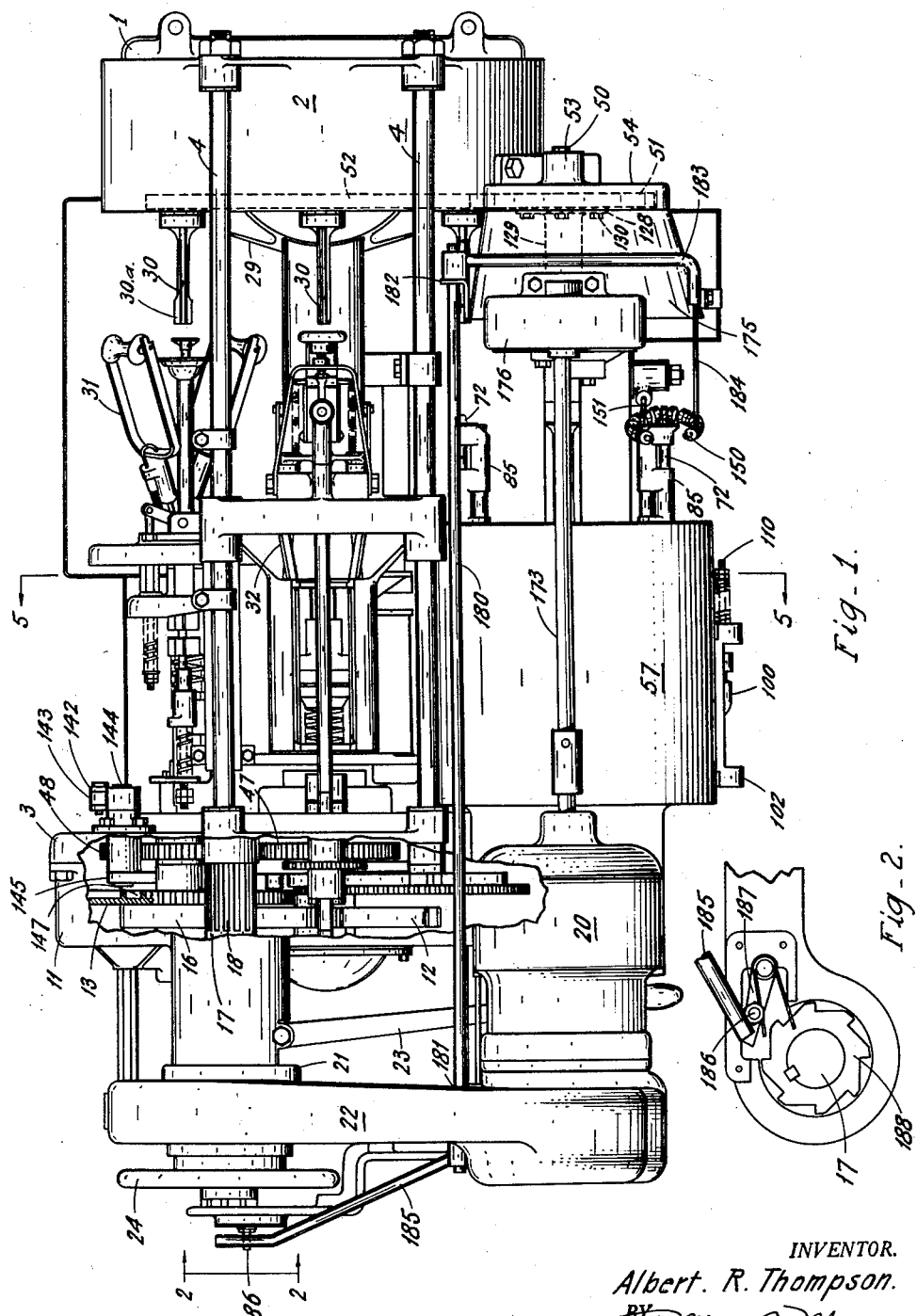
INVENTOR.
Albert. R. Thompson.
BY Philip A. Minnis
ATTORNEY INVENTOR.
Albert R. Thompson.
BY Philip A. Minnis
ATTORNEY.

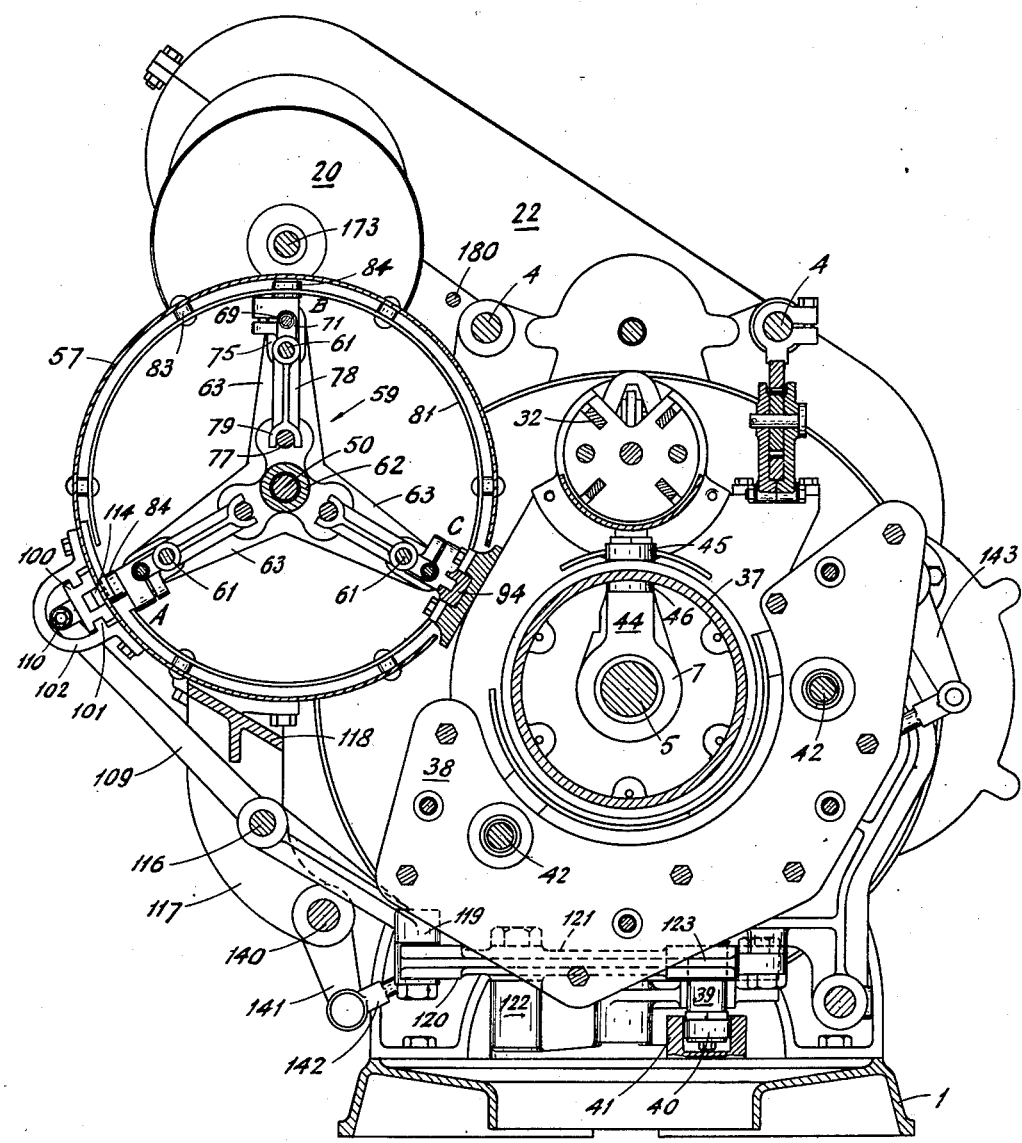
Fig_5.

Nov. 14, 1939.   A. R. THOMPSON   2,179,529
PEAR PREPARATION MACHINE
Filed Dec. 18, 1936    10 Sheets-Sheet 5
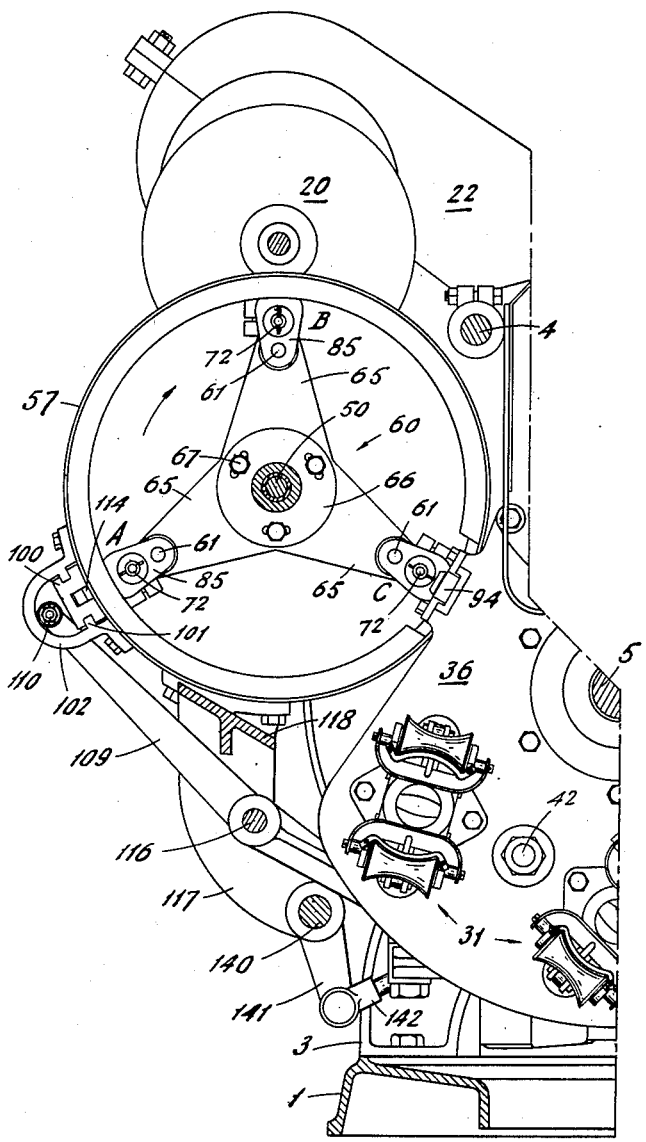
Fig_6.
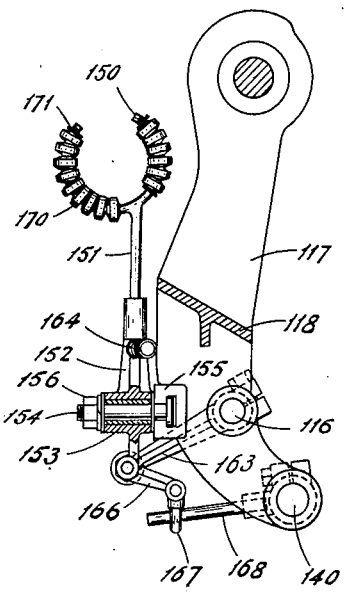
Fig_7.
INVENTOR.
Albert. R. Thompson.
BY Philip G. Minnis
ATTORNEY.

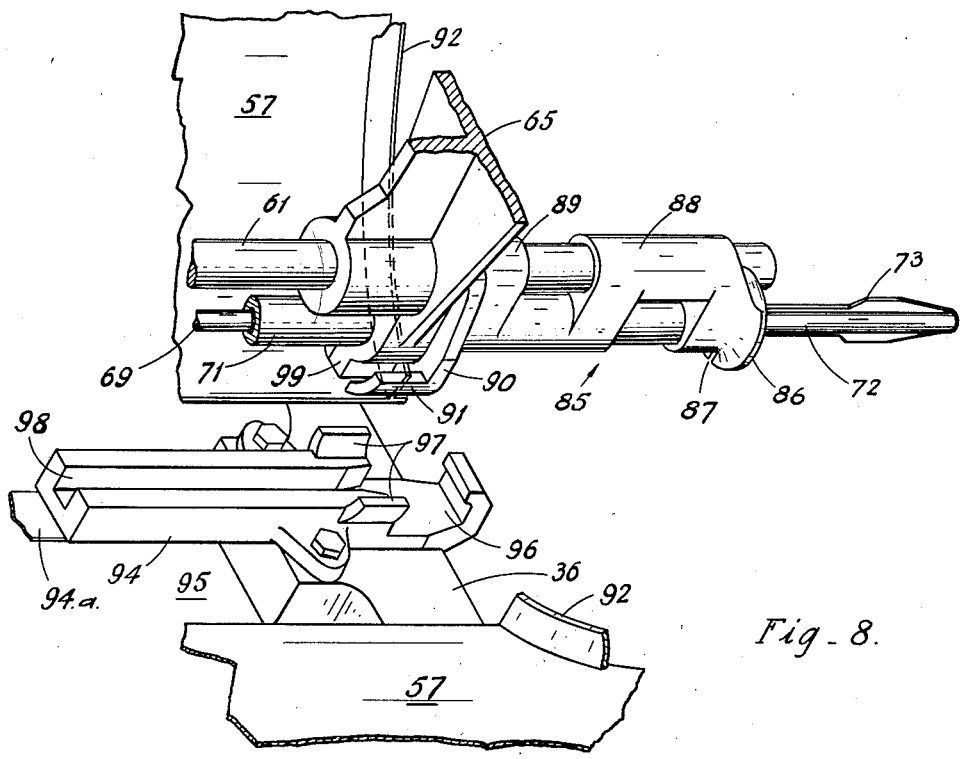
Fig_8.
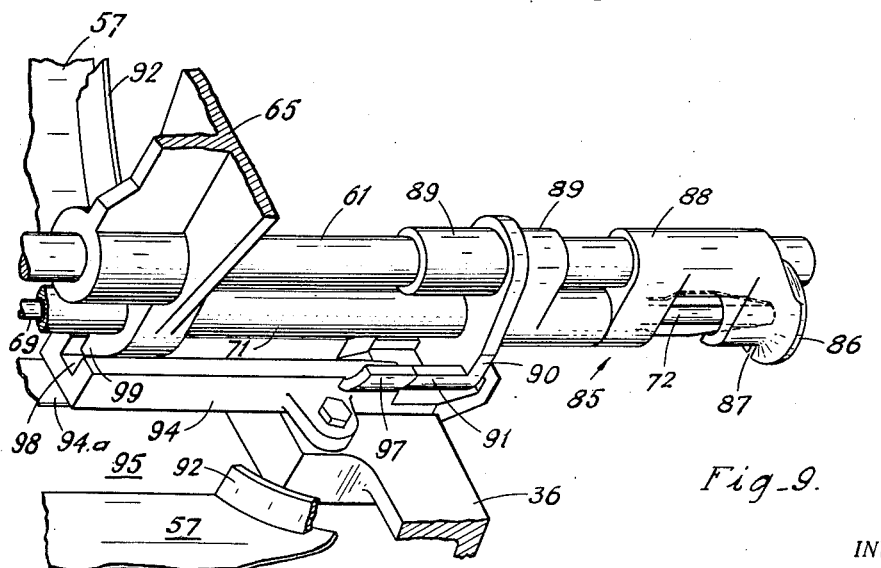
Fig_9.
INVENTOR.
Albert. R. Thompson.
BY Philip G. Minnis
ATTORNEY.

Nov. 14, 1939.  A. R. THOMPSON  2,179,529
PEAR PREPARATION MACHINE
Filed Dec. 18, 1936  10 Sheets-Sheet 7
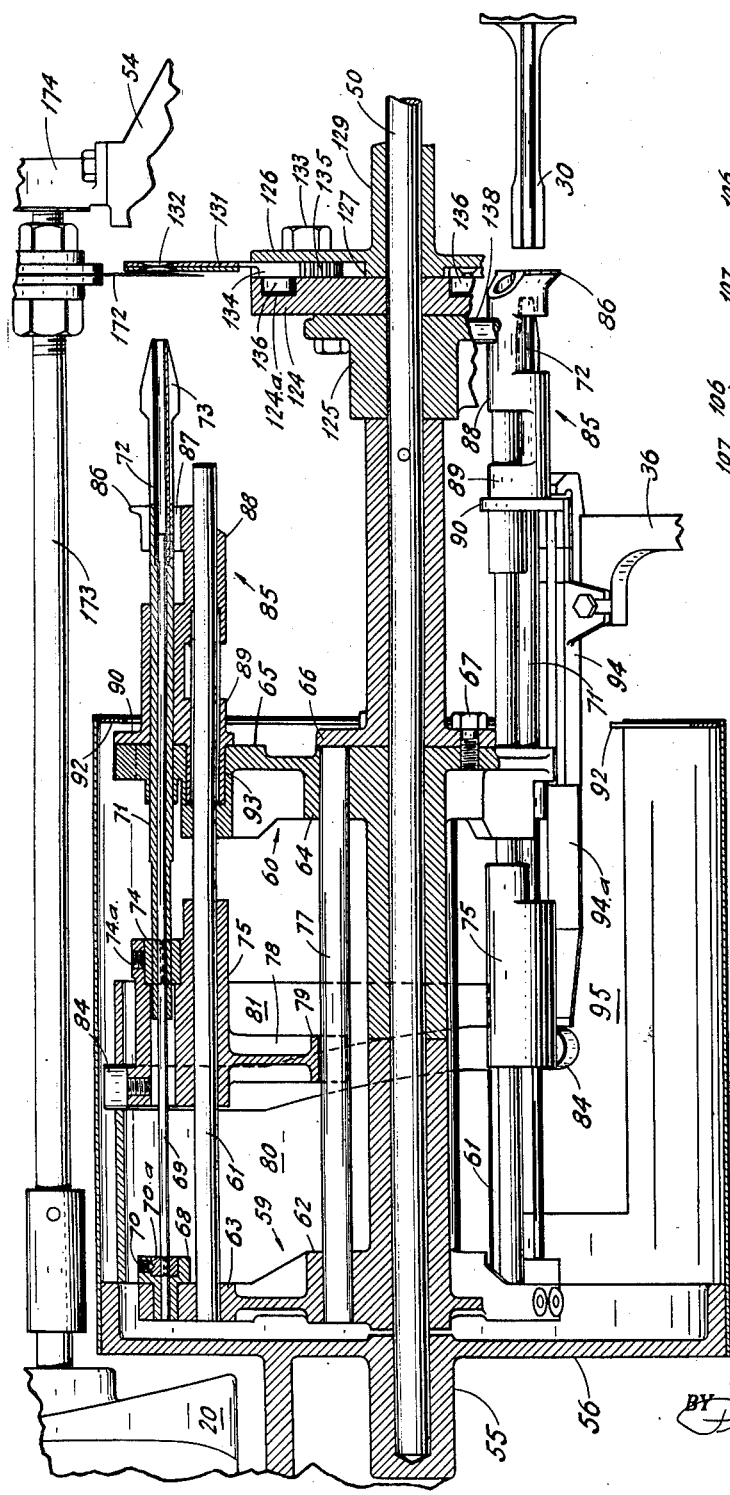
Fig. 10.
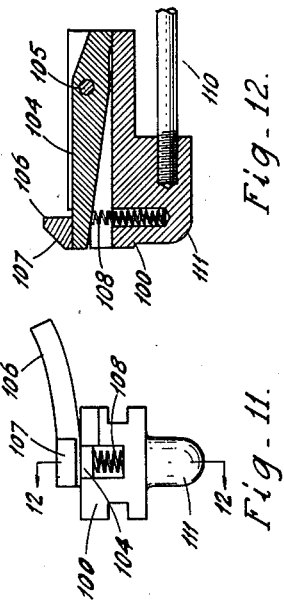
Fig. 11.
Fig. 12.
INVENTOR.
Albert. R. Thompson.
BY Philip A. Minnis
ATTORNEY.

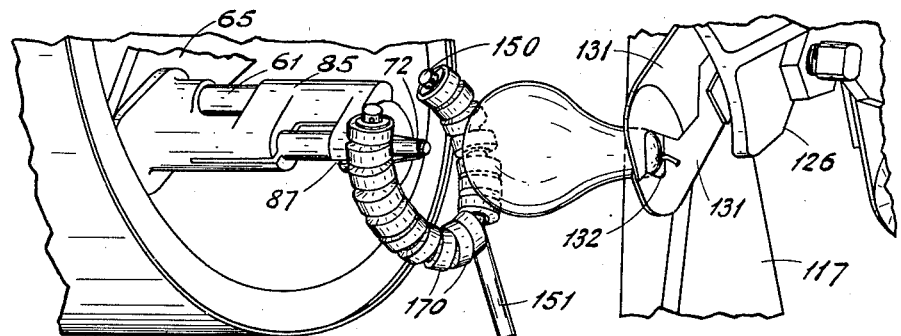
Fig_16.
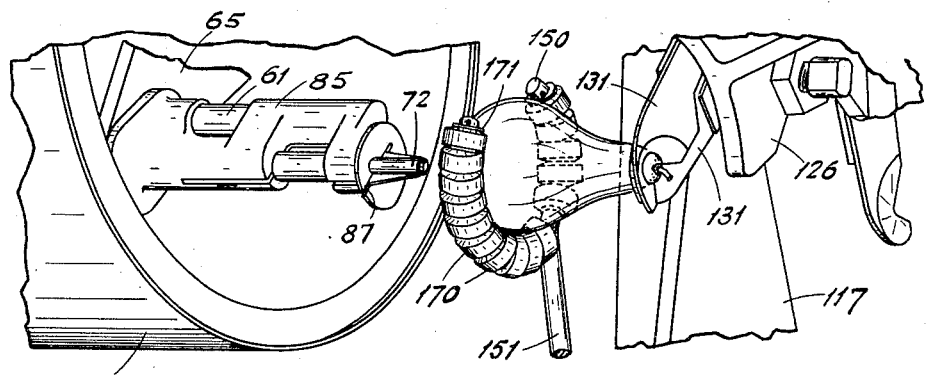
Fig_17.
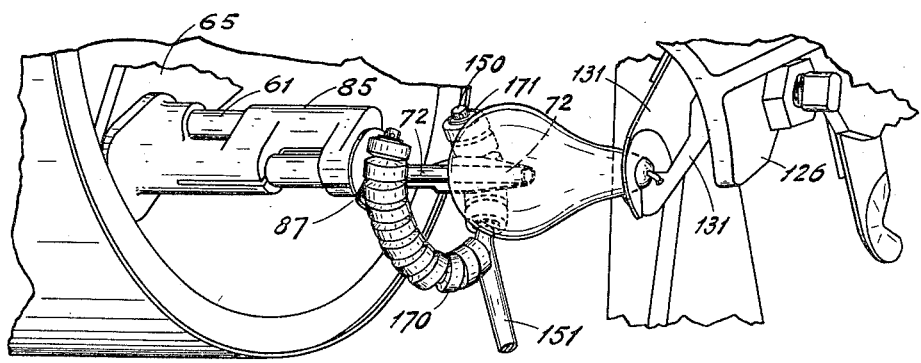
Fig_18.

Patented Nov. 14, 1939

2,179,529

UNITED STATES PATENT OFFICE 2,179,529

PEAR PREPARATION MACHINE

Albert R. Thompson, Los Gatos, Calif., assignor to Food Machinery Corporation, San Jose, Calif., a corporation of Delaware Application December 18, 1936, Serial No. 116,595

27 Claims. (Cl. 146—33)

This invention relates to improvements in fruit preparation machines of the character disclosed in the copending application of myself and William de Back, Serial No. 745,252, filed September 24, 1934, now matured into Patent No. 2,139,704, by which the operations for preparing fruit, such as pears, for canning or drying are performed automatically by mechanical means. More particularly, the invention relates to an improved feed mechanism for such machines for delivering the pears properly centered to the operative mechanisms of the machine.

To obtain symmetrical pear halves which have been completely peeled and from which all the core has been removed, it is essential that the pears be centered correctly. To this end, it has been found that proper centering of a pear can be effected by centering the stem end of the pear by the stem itself, and by centering the calyx end of the pear by the exterior contour thereof. The present invention contemplates the obtaining of this result by wholly automatic mechanism which eliminates reliance on the judgment of the operator, and the uneven, improperly cored pear halves resulting from errors in judgment.

A general object of my invention is to provide an improved machine to which the pears may be fed continuously and which operates to stem, peel, split, core and trim the fruit with a resultant improved product.

Another general object of my invention is to provide an improved machine of the above type by which the pears are centered entirely by automatic mechanism rather than by an operator.

Another object of my invention is to provide an improved feed mechanism for such machine to which pears may be fed continuously and which operates to center each pear accurately.

Another object of my invention is to provide an improved feed mechanism for such machines, which centers the pears correctly to insure efficient peeling, coring, and splitting operations.

Another object of my invention is to provide an improved feed mechanism for such machines, which centers the stem end of the pears by the stem and which centers the flower end of the pears by their exterior contour.

Another object of my invention is to provide an improved machine of the above type in which the drive is interrupted if the operator's hand is caught in the feed mechanism.

Other objects and advantages will be apparent from the following description of a preferred embodiment of my invention as illustrated by the accompanying drawings, in which:

Fig. 1 is a plan view of the machine with the upper portion of the gear cover broken away to disclose the arrangement of the main driving gears.

Fig. 2 is a fragmentary elevational view of the drive interrupting means, the view being indicated by the line 2—2 in Fig. 1.

Fig. 5 is a vertical sectional view taken in a plane indicated by the line 5—5 of Fig. 1.

Fig. 6 is a fragmentary vertical sectional view taken in a plane indicated by the line 6—6 of Fig. 3, the centering ring being omitted for clearer clarity.

Fig. 7 is a fragmentary view similar to Fig. 6, but showing only the centering ring and parts associated therewith.

Fig. 8 is a fragmentary perspective view illustrating the arrangement of one of the pushers with respect to the spindle and spindle frame arm with which it is associated, just before being carried into engagement with the latch block by which it is operated.

Fig. 9 is a fragmentary perspective view of the same parts shown in Fig. 8 illustrating the manner in which the pushers are actuated by the latch block.

Fig. 10 is a vertical sectional view taken longitudinally through the center line of the feed mechanism.

Fig. 11 is an end elevation of the shuttle block associated with the feed mechanism for actuating the impaling spindles.

Fig. 12 is a sectional view of the shuttle block taken in the plane of the line 12—12 in Fig. 11.

Fig. 16 is a fragmentary perspective view of the centering mechanism and associated impaling spindle as positioned when a pear is first presented thereto by an operator.

Fig. 17 is a view similar to Fig. 16 and illustrates the position of the centering mechanism after actuation thereof to center the pear.

Fig. 18 is a view similar to Figs. 16 and 17, showing the position of the centering mechanism and the impaling spindle after the pear is impaled on the spindle and the centering ring has been withdrawn.

The type of machine with which my invention is illustrated, and with which it is preferably employed, will be described briefly to enable a better understanding of construction and operation of the disclosed embodiment of such invention.

Generally, the machine comprises an intermittently rotating turret provided with a series of stemming tubes upon which the pears to be treated are impaled and advanced. The pears are delivered to the stemming tubes by means of a rotary feeding device to which they are manually delivered, and which is operated in timed relation to the turret to position the pears with their stem axes in alignment with the stemming tubes and impale them thereon. As the pears are carried away from the feeder by the stemming tubes, they are successively presented to a series of peeling devices mounted upon a reciprocating carriage, which is moved alternately toward and away from the turret in timed relation thereto so as to draw the peeling devices over the pears on the stemming tubes during the periods intervening between intermittent movements of the turret. After being presented to the several peeling devices, the peeled pears are then presented by the stemming tubes to a splitting and coring station where they are removed from the tubes and carried onto a splitting blade in operative relation with coring and butt trimming knives, which operate to cut out the cores and trim the butt ends of the pears. These latter devices complete the cycle of operations on the pears which, having been stemmed, peeled, cored, trimmed and split into halves, are then released into a discharge mechanism which ejects the finished halves from the machine.

*The turret and drive*

Figure 3:
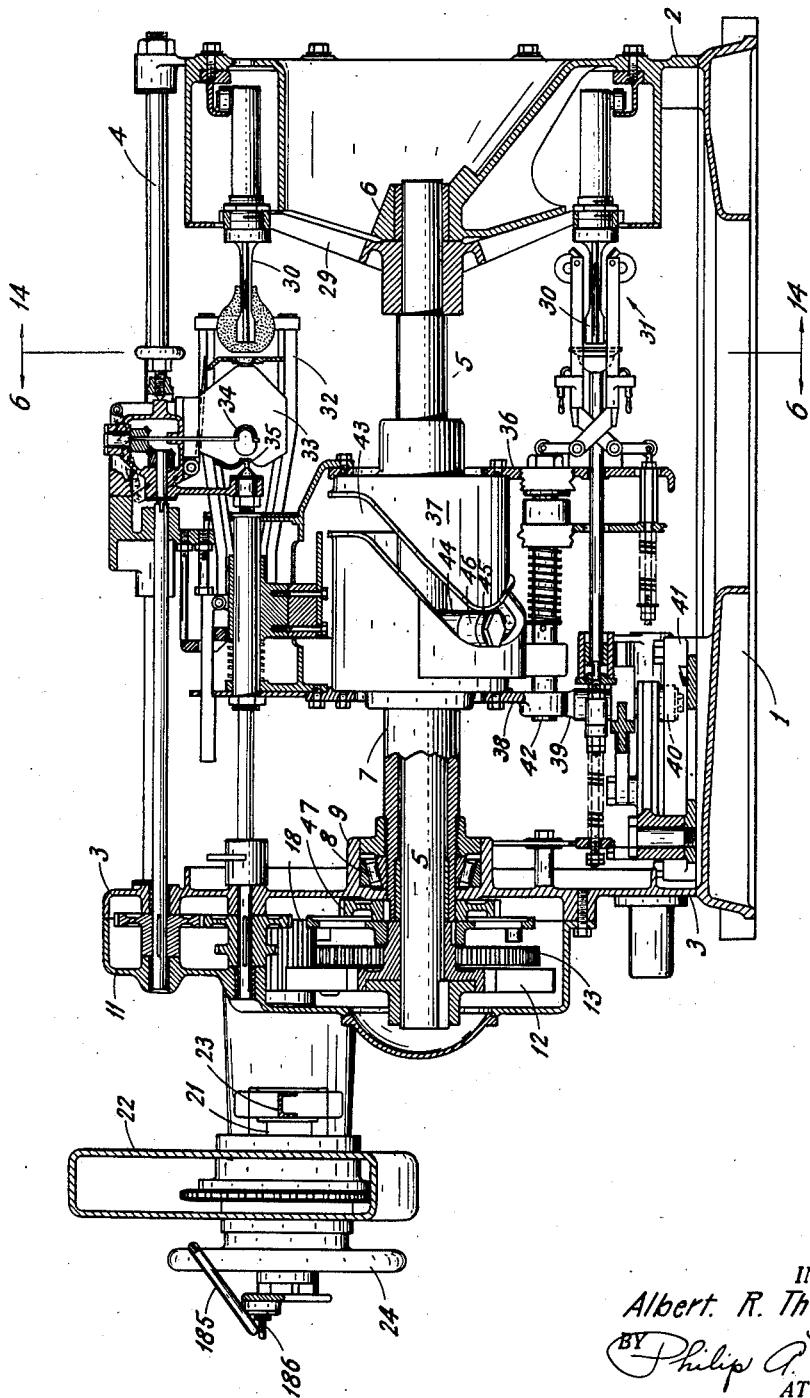
Fig. 3 is a vertical sectional view taken along the longitudinal center line of the machine, with the cam cylinder, the splitting and coring mechanism, and certain associated parts shown in elevation. In this figure, the reciprocating carriage has been advanced to the end of its forward stroke.

With the foregoing general description in mind, the details of the mechanisms referred to will become apparent by first referring to Figs. 1 and 3 wherein it will be seen that the machine includes a supporting framework made up of a base 1 upon which is mounted a pair of opposed end standards 2 and 3 rigidly interconnected by a pair of tie rods 4. Extending between, and supported by the end standards, is the turret shaft 5, rotatably journalled at one end in a bearing 6 carried by the end standard 2 and supported adjacent its other end by a sleeve 7 journalled in roller bearings 8 disposed within a bearing housing 9 formed integral with the end standard 3.

Figure 4:
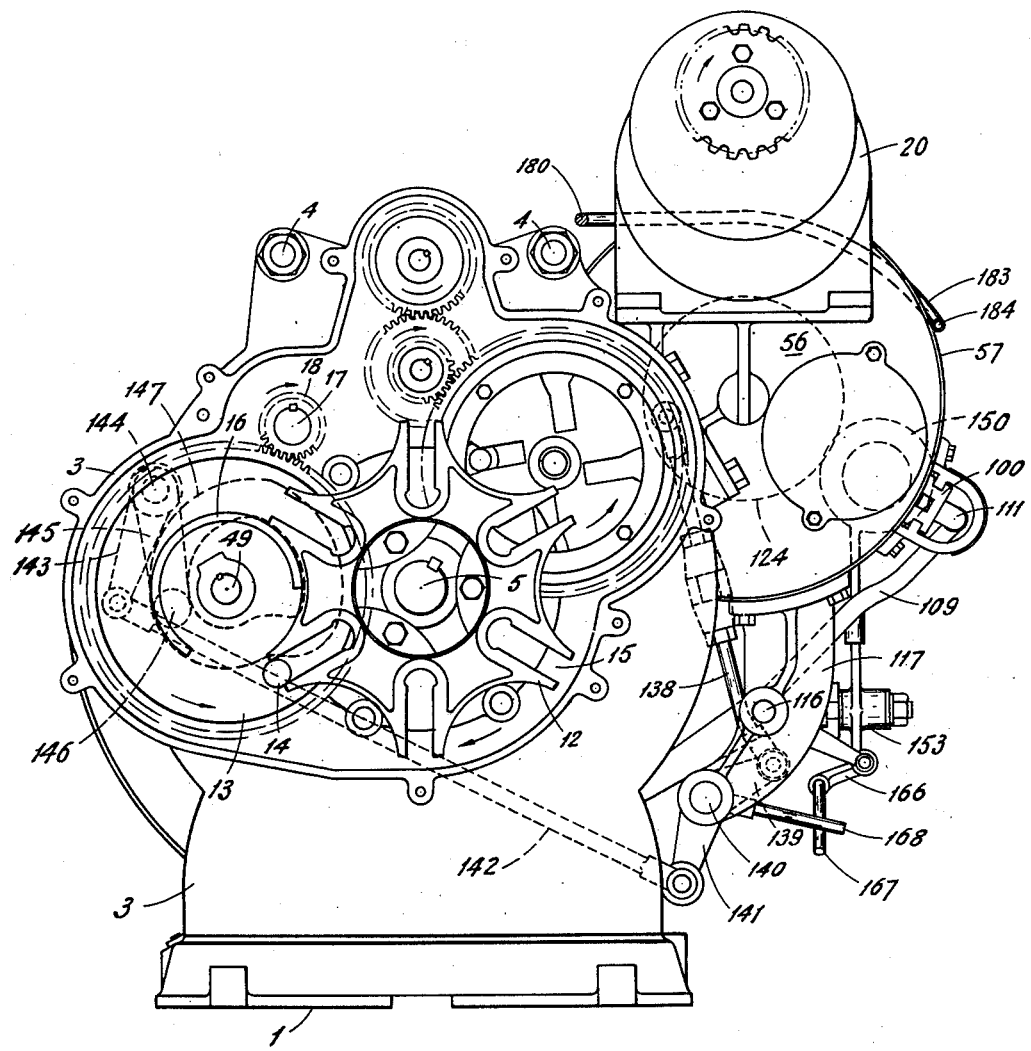
Fig. 4 is an end elevation of the left hand end of the machine with the gear cover and parts thereof removed to show the driving gears.

The turret shaft 5 projects beyond the end standard 3 into a gear chamber formed by a gear cover 11 secured to the outer flanged face of the end standard and is intermittently rotated one-sixth of a revolution at a time by means of a Geneva gear 12 keyed thereto (see Figs. 1 and 4) and actuated by the Geneva driver 13 carrying the usual driving roller 14 which engages with the radial slots 15 in the Geneva gear for driving the same. When the driving roller 14 is out of driving engagement with the Geneva gear the latter is locked against rotation by the locking pin 16 carried by the driver 13.

The Geneva movement described is driven from the continuously rotating main drive shaft 17 carrying a driving pinion 18 which intermeshes with suitable gear teeth extending around the periphery of the Geneva driver 13. Power for operating the main drive shaft 17 may be supplied from an electric motor 20 through a clutch 21 by means of suitable drive connections inclosed within a guard casing 22 conveniently mounted on the gear cover 11. As the clutch 21 may be of a conventional self-opening type such as that disclosed in the patent of William de Back No. 1,985,242, dated December 25, 1934, it is thought unnecessary to disclose details of its construction. The clutch may be actuated into and out of engagement by control lever 23 so as to connect or disconnect the drive for the shaft 17 and the pinion 18. A hand wheel 24 may be connected to the drive shaft 17 so as to permit the machine to be turned over by hand if desired.

Fixed to the turret shaft 5 near the right hand end thereof, as viewed in Fig. 3, is a turret 29 provided with an annularly arranged series of stemming tubes 30 having radial fins 30a. Six tubes 30 are shown in the illustrated embodiment, upon which the pears to be processed are impaled, stem end first, by a feeding mechanism hereinafter to be described. The construction of the stemming tubes and their associated mechanism is not important to the instant invention and is fully disclosed in said application Serial No. 745,252.

Under the intermittent rotative movements of the turret 29, each of the stemming tubes 30 is successively brought into registration with the feed mechanism to be disclosed later, a series of peeling units, and a coring and splitting unit, the operation of these parts being timed in relation to the rotation of the turret so as to take place while the turret is stationary, the peeling units and the clamp assembly of the coring and splitting unit being advanced and retracted during each period that the turret is at rest. For this purpose, the peeling units 31 and the clamp assembly 32, for bringing the fruit into operative relation with the stationary splitting blade 33 and the stationary coring and trimming knives 34 and 35, all of conventional construction, are supported by a reciprocating carriage including a plate 36 secured to the forward end of a cam cylinder 37 and a rear plate 38 also secured to the cam cylinder. The cam cylinder is slidably journalled on the turret shaft 5 and the sleeve 7 for axial reciprocation thereover, and the rear plate 38 carries a depending post 39 which is provided at its lower end with a follower roller 40 (Figs. 3 and 5) engaging in a rectilinear groove in a guide block 41 on the base 1. This mechanism serves to prevent rotation of the cam cylinder 37 about the axis of the turret shaft 5.

The cam cylinder 37 is separated intermediate its length to form two complementary sections rigidly held in spaced relation to each other by means of spacer rods 42 (Figs. 3 and 5) extending between the end plate 38 and the plate 36, thereby forming a cam groove or slot 43 between the adjacent sections of the cam cylinder. Axial reciprocation is imparted to the cam cylinder 37 from the sleeve 7, which is rotatably journalled on the turret shaft 5 and carries a radially projecting post 44 on which is mounted a pair of cam rollers 45 and 46, the latter of which engages with the cam slot 43, while the former may be used in conjunction with the splitting and coring unit. The sleeve 7 is continuously driven through the medium of a gear 47 (Figs. 1 and 3) secured thereto and intermeshing with a gear 48 keyed to the continuously driven shaft 49 (Fig. 4) which carries Geneva driver 13.

As seen in Fig. 3, the cam slot 43 extends part way around the cam cylinder in a plane at right angles to the axis of the cylinder, and the remainder of its length includes a pair of reversely related angular portions. By this configuration of the cam slot it will be apparent that while the sleeve 7 rotates continuously, the cam cylinder itself is only intermittently reciprocated, since it is only actuated during part of each revolution of the sleeve. The disposition of the cam slot with relation to the drive mechanism is such that the cam cylinder remains stationary during rotative movements of the turret 29 and the feeding mechanism, and is advanced and retracted during the periods intervening between the intermittent rotative movements of the turret and feeding mechanism.

The construction and operation of the peeling, coring, and splitting mechanisms, as well as the clamp mechanism and the mechanism for discharging the pair halves from the machine, are fully described in said application, Serial No. 745,252, and further description is believed unnecessary here.

*The feeding mechanism*

For feeding the pears to the stemming tubes 30 and impaling them thereon in accurately centered position with respect to their stem axes, a mechanical feeding mechanism is provided which is operated in timed relation to the turret 29 to deliver the pears automatically onto the stemming tubes in properly aligned positions.

Figures 14, 15:
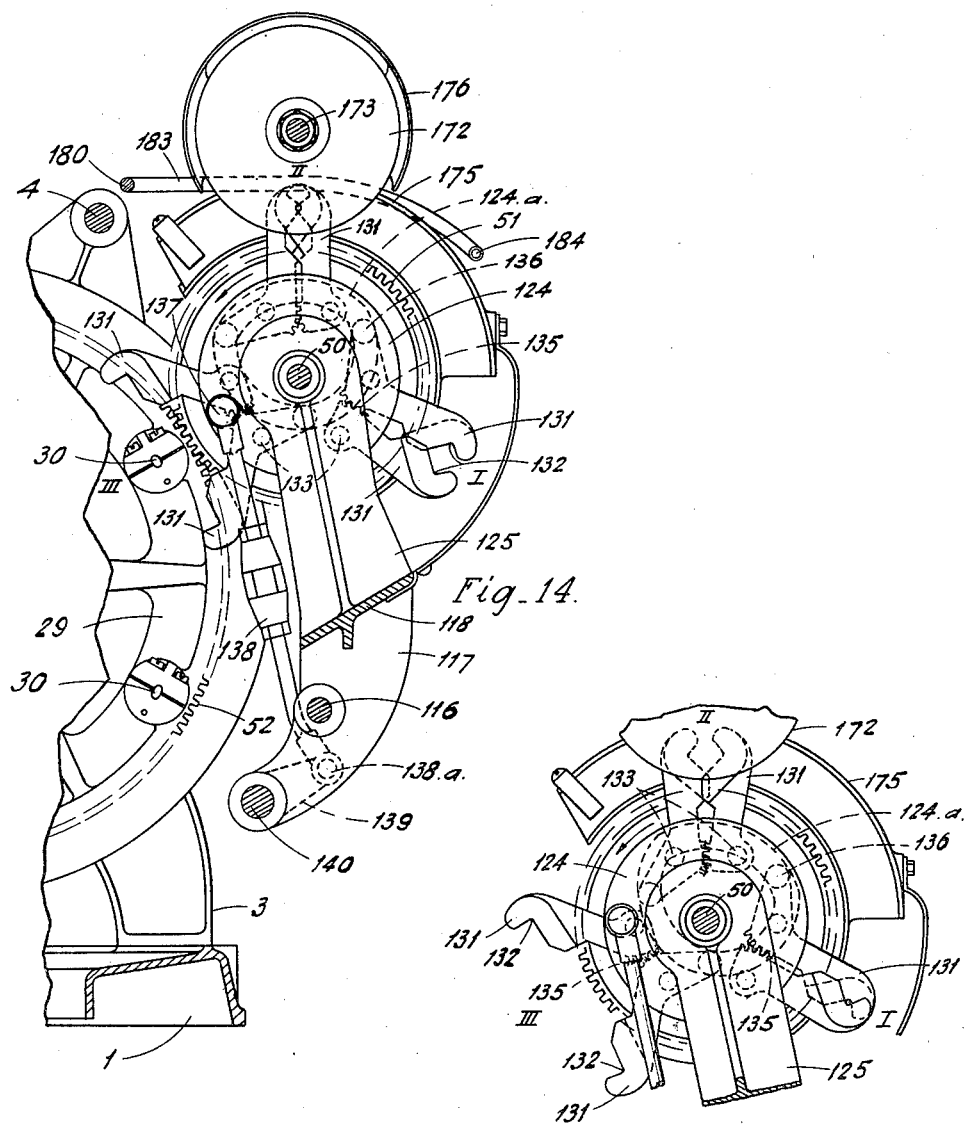
Fig. 14 is a fragmentary vertical sectional view taken transversely of the machine in the plane of the line 14—14 of Fig. 3, the centering blades at the feed position (I) being shown in position to receive a pear.
Fig. 15 is a view of the centering blades similar to Fig. 14 but showing the blades closed at the feed position to grasp the stem of a pear prior to rotation of the feed mechanism.

Such feeding mechanism (see Figs. 1, 10 and 14) includes a drive shaft 50 extending longitudinally of the machine along one side thereof and intermittently rotated one-third revolution at a time in an anti-clockwise direction as viewed in Fig. 14, by means of a gear 51 secured to the shaft and intermeshing with gear teeth 52 formed around the periphery of the turret 29. The drive shaft 50 is journalled at one end in a bearing 53 (Fig. 1), carried by a bracket 54 secured to the end standard 2 and at its other end in a bearing 55 (Fig. 10) formed on the end closure 56 of a cylindrical cam housing 57, which may be suitably secured to the end standard 3.

As best seen in Figs. 5, 6 and 10, a pair of spindle frames generally indicated at 59 and 60 are mounted upon the drive shaft 50 within the cam housing 57, and are interconnected for rotation in unison by tie rods 61. The rear spindle frame 59 includes a hub portion 62 and a plurality of radially extending arms 63, three in all in the illustrated embodiment. The forward spindle frame 60 also includes a hub portion indicated at 64 and a plurality of radiating arms 65 corresponding in number to those of the rear spindle frame, but of slightly modified construction for a purpose to become more apparent hereinafter. The spindle frames are driven from the shaft 50 by means of a flanged coupling 66 pinned to the shaft and fastened to the forward spindle frame by cap screws 67 extending through suitable slots in the flanged portion of the coupling.

The arms 63 of the rear spindle frame are bored near their outer ends for the reception of sleeves 68 pressed therein to receive ejector rods 69 which are secured therein by set screws 70 engaging split clamping bushings 70a seated in the sleeves 68, and these rods project interiorly of spindle sleeves 71 which are slidably mounted in the spindle frame. The spindle sleeves 71 are slidably journalled in the forward spindle frame arms 65, which are suitably bored for their reception, and carry tubular spindles 72 brazed to their forward ends so as to be firmly secured thereto. The spindles 72 have their free ends sharpened to a knife like edge, and have opposite integral fins, as indicated at 73. Spindles 72 serve to receive the pears which are impaled thereon butt ends first and carry them into properly centered relation to the stemming tubes 30 for transfer thereto with fins 73 aligned with the tube fins.

The rear ends of the spindle sleeves 71 are adjustably mounted in slit clamping bushings 74 seated in slide blocks 75, set screws 74a serving to clamp sleeves 71 in the bushings 74. Slide blocks 75 are slidably journalled on the tie rods 61 which parallel the spindle sleeves and are rigidly secured in the spindle frames by suitable means. Guide rods 77 are provided to prevent rotation of the slide blocks about the rods 61, and for this purpose, the slide blocks are provided with arms 78 having semi-cylindrical bearings or yokes 79 formed on their outer ends to embrace the rods 77 for sliding movement therealong.

The spindle sleeves 71 are axially reciprocated during rotation of the spindle frames so as to advance and retract the spindles 72 in timed relation to the operation of a centering mechanism shortly to be described, so as to impale the pears thereon in correctly aligned position as they are presented thereto by the centering mechanism and then present them to the stemming tubes 30 carried by the turret 29. This is accomplished in part by stationary cam plates 80 and 81 secured to the inner surface of the cam housing 57 by spacer lugs 83, and partly by a reciprocating latch mechanism to be described later, all of which are arranged to operatively engage with roller cam followers 84 carried by the slide blocks 75, cams 80 and 81 having advanced a spindle 72 to its farthest forward position when in alignment with the stemming tube 30 at the transfer position shown in Fig. 10.

The mechanism for pushing the pear off of a spindle onto a stemming tube, as best seen in Figs. 8, 9 and 10, includes a pusher 85, one of which is slidably mounted on each spindle sleeve 71, and each pusher is provided at its outer end with an annular flange 86 forming a pusher head for engagement with a pear impaled on the spindle 72. The flange 86 is slotted at 87 to receive the fins 73 of the associated spindle 72. Each pusher 85 has offset apertured bosses 88, 89 slidably engaged with an extending end of the adjacent guide rod 61 to maintain the alignment of the pusher with the spindle. The rear end of each pusher also carries a bracket plate 90 provided with a pair of rearwardly projecting lugs 91, which with the pusher in retracted position as shown in Figs. 8 and 10 extend to either side of the adjacent arm 65 while bracket plate 90 is engaged with the arm 65. The pushers 85 are normally held in retracted position, as shown in Figs. 8 and 10 by an annular flange 92 secured to the inner surface of the cam housing 57 adjacent its open end, in which position an end of the bearing 89 is received in a recess 93 in the associated spindle arm 65.

The pushers are actuated at the proper moment by means of a reciprocating latch block 94 mounted on the edge of the reciprocatory carriage 36 directly beside the position marked C of the spindle assemblies and operative in an opening 95 in the cam housing 57. The latch block 94 is transversely channeled at 96 and in its retracted position, as illustrated in Fig. 8, the channel is aligned with the path followed by the outer ends of the spindle arms 65 and pusher bracket plates 90 so as to receive them therein as they come to rest at position C. A pair of lugs 97 project upwardly from the latch block for engagement with the corresponding lugs 91 on the bracket plates 90.

During the rest period of each spindle assembly at position C the latch block is carried first forwardly, as illustrated in Fig. 9, and then rearwardly by the movement of the carriage 36 to which it is secured. As the latch block moves forwardly the lugs 91 on the pusher bracket plate 90 are engaged by the corresponding lugs 97 carried by the latch block 94, and the pusher is thereby advanced so as to push the pear off the spindle 72 onto the stemming tube 30 aligned therewith.

Upon reverse movement of the latch block 94 its hooked end engages the bracket plate 90 and returns the pusher to its original normal position with respect to the spindle arm as shown in Fig. 8. During the reciprocative movements of the latch block and pusher, the spindle frames 63 and 65 are rigidly locked against any rotative movements such as might misalign the spindle 72 with the stemming tube 30 by means of a longitudinal groove 98 in the face of the latch block which slidably engages with a key 99 projecting from the outer end of each spindle arm 65.

The reverse movement of the latch block 94 is also utilized to retract the aligned slide block 75 and its associated impaling spindle. For this purpose, the latch block carries a rearwardly projecting resilient strip 94a (Fig. 10) which has its end bent to engage in front of the roller 84 of a slide block 75 when the latch block is in its forward position. The resiliency of the strip 94a provides for yielding thereof in passing forwardly over the roller 84 during the forward movement of the latch block to the position shown in Fig. 10. During the subsequent reverse movement of the latch block 94, the slide block 75 is returned to initial position for subsequent actuation by the shuttle block of a hereinafter described reciprocating latch mechanism which advances the spindles to impale the pears. As an impaling spindle 72 is retracted with its slide block, the associated rod 69 will eject the severed part of the pear from within the spindle.

Upon completion of the reciprocative movements of the latch block 94 and pusher 85, whereby the pear is transferred from the spindle 72 to the stemming tube 30, the spindle assembly is rotated back to position A, the turret 29 revolving at the same time to carry the stemming tube 30, with the pear impaled thereon, into operative relation with the first peeling unit and to bring another stemming tube into alignment with the next succeeding spindle as it arrives at position C.

The latch mechanism referred to (see Figs. 5, 11, 12 and 13) is mounted on the outside of the cam housing 57 directly beside one of the positions at which the spindle sleeves come to rest at each idle period between the intermittent rotative movements of the spindle frames. Said mechanism includes a grooved a shuttle block 100 slidably mounted on parallel guides 101 carried by a guide frame 102 secured to the outside of the cam housing over an opening 103 cut therein and through which the shuttle block projects. The rear face of the shuttle block carries a latch 104 pivoted to the block at 105 and having a hooked end formed by an arcuate cam finger 106 projecting upwardly from the body of the latch and provided with a bevelled portion 107. A spring 108 normally urges the hooked end of the latch outwardly away from the shuttle block.

Figure 13:
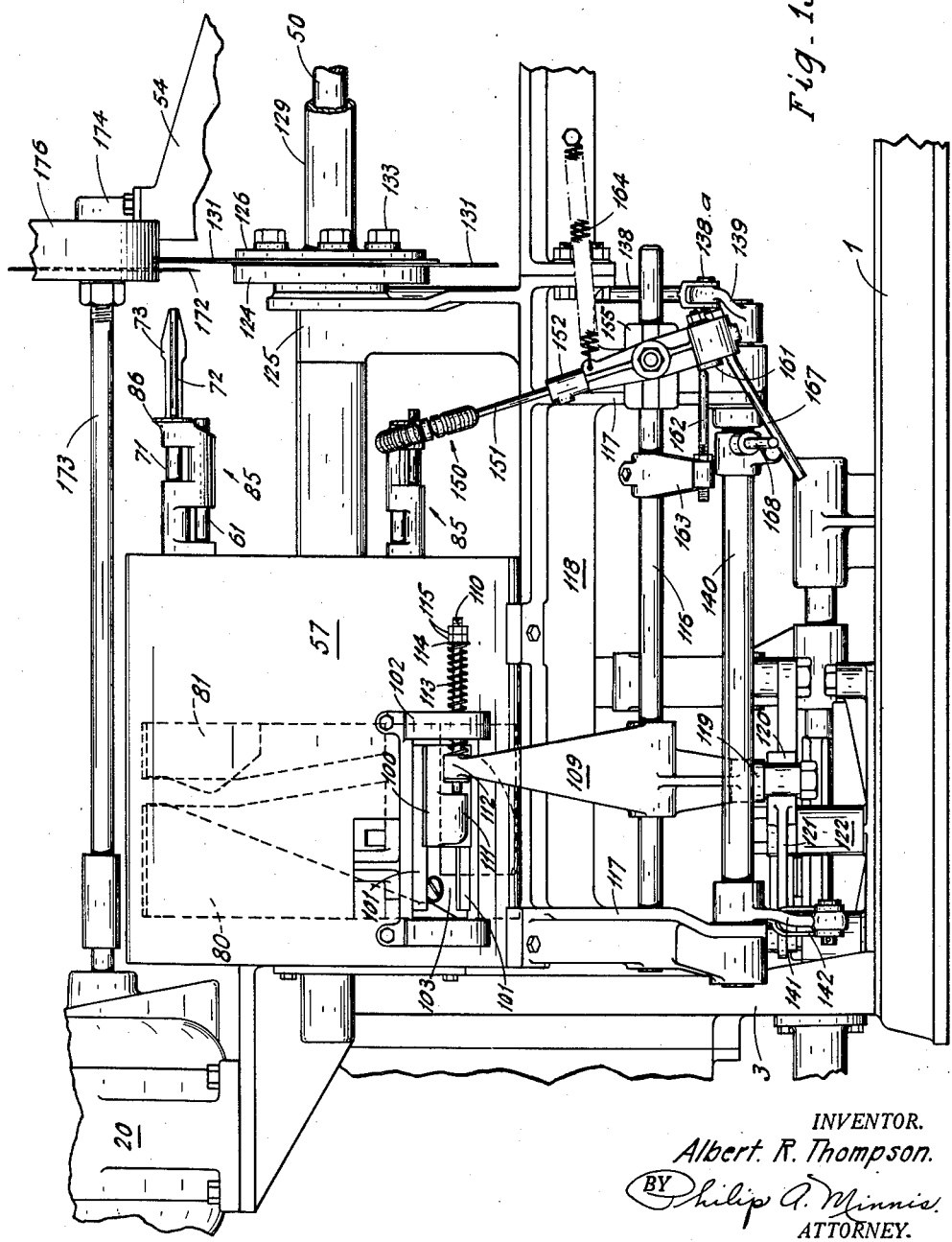
Fig. 13 is a side elevation of the feed mechanism.

The shuttle block 100 is normally retained in its extreme forward position, as illustrated in Fig. 13, during the rotative periods of the spindle frames, and is reciprocated once during each stationary period of the spindle frames. Reciprocation of the shuttle block is effected by means of a shift arm 109 which is loosely connected to the shuttle block by means of a pin 110 carried by a boss 111 on the front of the block and slidably projecting through a bearing 112 in the upper end of the shift arm. A light coil spring 113 surrounds the pin between the face of the shift arm and a washer 114 held on the pin by means of jam nuts 115, which may be adjusted to vary the tension of the spring, as will be apparent.

The shift arm 109 (see Figs. 5 and 13) is secured on a shift rod 116 extending longitudinally of the machine and having its ends slidably mounted in brackets 117 depending from a side rail 118 secured at one end to the under side of the cam housing 57 and at the other end to the bracket 54. The shift arm is provided with a gudgeon 119 at its lower end which engages a bearing 120 formed on one end of a horizontal rock arm 121 pivotally journalled intermediate its length on a vertical pivot stud 122 secured to the base 1. The opposite end of the rock arm 121 also carries a bearing 123 journalled on the guide post 39 depending from the end plate 38. It will be recalled that the cam cylinder 37 is reciprocated during each of the periods intervening between the rotative movements of the turret 29 and of the drive shaft 50 of the feed mechanism.

By the arrangement just described, it will be seen that as each spindle 72 is carried by the spindle frames 59 and 60 into position A, as indicated on Figs. 5, 6 and 16, and during the idle periods between intermittent rotative movements of the spindle frames, the shuttle block 100 is successively moved first to the left, as viewed in Fig. 13, and then to the right, the spindle frames being stationary during this time. As the shuttle block moves to the left, the latch 106 rides over the adjacent cam roller 84 carried by one of the slide blocks 75 and snaps into place behind it. When the shuttle block is then moved back to the right, the latch engages the cam roller and yieldingly moves the slide block 75 to the right, thereby also advancing its associated spindle 72 to engage the blossom end of a pear presented to it by the centering mechanism. Upon reaching the forward or right hand end of its stroke, the shuttle block stops and remains idle during the succeeding rotative movement of the spindle frames, which brings the next succeeding slide block 75 and associated spindle into position for actuation by the shuttle block, which thereupon repeats the cycle of operations described.

For a proper understanding of the movements of the spindles and the purposes accomplished thereby throughout their cycle of rotation, it will be convenient to consider their operation in conjunction with the construction and operation of the centering mechanism which is cooperatively associated with the spindle mechanism and which operates in unison therewith. Such centering mechanism as previously stated includes a stem end centering mechanism for positioning the stem end of the pear with reference to its stem, and a calyx end centering mechanism for positioning the calyx end with reference to its exterior contour, so that the pear is presented in proper centered relation to an impaling spindle, i. e., with its longitudinal axis substantially in line with the spindle axis.

The stem end centering mechanism, best seen in Figs. 10, 13, and 14, includes an oscillatory cam disc 124 journalled on the shaft 50 adjacent a supporting standard 125 carried by the side rail 118 which extends alongside the machine. Mounted on the drive shaft 50 in opposed relation to the cam disc 124 is a drive disc 126, the face of which is held in spaced relation to the cam disc by a centrally arranged spacer boss 127. The drive disc is intermittently rotated by a flange 128 (Fig. 1) formed on its hub portion 129 and secured to the intermittently driven gear 51 by cap screws 130.

Mounted between the opposing faces of the discs 124 and 126 (Figs. 10 and 14) are three pairs of scissor like centering blades 131 corresponding to the three spindles 72 and arranged in alignment therewith. The centering blades of each pair are provided with complementary notches 132 and are pivotally mounted on the drive disc 126 by studs 133. The edges of the notches 132 are preferably sharpened except at their apexes and for a short distance immediately adjacent thereto, at which places they are upset or dulled in order that they may clamp the stem portions of the pears therebetween in the manner shortly to be described. The inner ends of the blades are provided with oppositely disposed bosses 134 which hold the blades 131 in shearing relation, and the adjacent edges of the bosses are provided with intermeshing gear segments 135 whereby the blades of each pair are operated in unison. One of the blades of each pair is provided with an arm carrying a cam roller 136 which engages a cam slot 124a cut in the face of the oscillatory cam disc 124.

It will be seen that the centering blades 131 and the spindles 72 are rotated in unison and in aligned relation. The positions assumed by the several pairs of centering blades during each period between intermittent rotative impulses is shown in Fig. 14, wherein the positions I, II and III correspond and are opposite the positions A, B and C, respectively, of the spindles 72, as indicated in Fig. 6. As may be seen in Fig. 14, the centering blades in position I are slightly overlapped so that the notches 132 form a restricted aperture, this being the initial condition of the blades in position I. As each pair of blades comes to rest in this position, the operator manually inserts the stem end or nose of a pear into the aperture formed by the notches (see Fig. 16), whereupon the pair of blades are operated by movement of the cam disc 124 to shear through the flesh of the pear supported therebetween, and snugly grip the stem of the pear between the dull apexes of the complementary notches 132, thereby accurately centering the stem end of the pear with reference to the stem itself, as illustrated in Fig. 17.

To effect the closing of the centering blades, the cam disc 124 (Figs. 4 and 10) has pivotally secured thereto at 137 an adjustable link 138 (Fig. 14) which has its lower end pivotally connected at 138a to arm 139 on shaft 140 which is journalled in the brackets 117. Adjacent standard 3 (Fig. 4) the shaft 140 carries an arm 141, which has its free end pivotally connected to a link 142 which extends upwardly and across the machine to be pivotally connected to an arm 143 on a shaft 144 journalled in a suitable bracket on the end standard 3. The shaft 144 also carries arm 145 having a cam follower roller 146 engaging in a cam groove 147 formed integrally in a face of the driver 13. The function of the cam groove 147 during its rotation is to operate through the connecting linkage to oscillate shaft 140 once during each cycle of the operation of the machine. The oscillation of shaft 140 serves through link 138 to oscillate the cam disc 124 in a clockwise direction as viewed in Fig. 14, so that the cam groove thereof serves to move the blades 131 at the I position to close on the stem of the pear, as illustrated in Fig. 15. At the same time, the calyx end centering mechanism becomes operative, and such mechanism will now be described.

The calyx end centering mechanism comprises a ring or ring-like centering means which engages about the calyx end of the pear to center such end with reference to the exterior contour thereof. More specifically, such mechanism includes ring 150 (Figs. 7 and 13) which may be supported in substantial axial alignment, when operatively engaging a pear, with the notches 132 of the centering blades and with spindle 72. Ring 150 may be formed integrally at the upper end of a rod 151 and may be provided with a gap at the top to permit the projected impaling spindle to pass therethrough. The rod 151 is suitably secured at its lower end in an upstanding arm of a ring lever 152 having a hub 153 pivoted by a suitable bushing on a stud 154 between suitable washers. The stud 154 has a flanged head slidably received in a T-shaped groove of a guide bracket 155 on the right-hand depending bracket 117 to provide for adjustment of the ring lever relative to the centering blades to accommodate different sizes and varieties of pears. A selected adjusted position of the ring lever on the bracket 155 is maintained by a clamping nut 156 threaded on the stud 154.

Ring lever 152 extends downwardly from its pivotal support on the stud 154 and is provided with a face 161 (Fig. 13) for engagement with rod 162 adjustably threaded in an arm 163 clamped on the shift rod 116. The rod 162 serves to rock the ring lever 152 and ring 150 to the position shown in Fig. 13 at the end of each dwell in the rotation of the spindle carrier against the tension of a spring 164 connected between the upper arm of ring lever 152 and the frame. The depending arm of the ring lever 152 also carries a lateral extension 166 in which a rearwardly extending rod 167 is secured so that it extends beneath a radially projecting rod 168 suitably clamped on the rock shaft 140.

The above described mechanism operates to permit advance and to positively retract the centering ring in timed relation to the movement of the impaling spindle and the centering blades. It will be recalled that the rod 116 is maintained in the position shown in Fig. 13 except just prior to and during the dwells in the rotation of the carrier spindle. Thus, during such periods, the small rod 162 carried by the shift rod 116 is engaged with face 161 of the ring lever, thereby maintaining the centering ring in its inoperative position as illustrated in Figs. 13 and 16. Just prior to a dwell in the rotation of the carrier spindle, the shift rod 116 is retracted by the operation of its controlling cam and linkage, however, the centering ring is maintained out of engagement with a pear by virtue of the engagement of its arm 167 under the arm 168 on rock shaft 140 as described above.

It will be recalled that rocking of shaft 140 serves, by oscillation of the cam controlling the centering blades, to cause such blades to shear through the flesh of the pear and grasp the stem therebetween. The rocking of shaft 140 also lifts the arm 168 to release the centering ring so that it can move under the influence of its spring 164 into engagement with the calyx end of the pear, this action preferably occurring at approximately the same time or shortly after the centering blades close to grasp the pear stem. In other words, the centering blades close sufficiently to prevent endwise movement of the pear when the centering ring engages the calyx, but preferably will not close sufficiently, prior to contact of the ring with the pear, to interfere with the centering movement of the calyx end.

The action of the centering ring as it engages the calyx end of the pear is to shift the calyx end of the pear laterally so that its exterior contour is centered with reference to the ring, and to facilitate such movement, the ring 150, as best seen in Fig. 7, may be provided with a plurality of rollers 170, freely journalled thereon between spacing washers 171. Rollers 170 are preferably formed of more or less soft rubber to avoid injury to the pears. It will be apparent that because the rollers 170 lie in planes which extend radially of the ring so as to intersect at its axis, they provide rotatable or "live" contact points with the pears, and enable easy movement of a pear relative to the ring, so that it will quickly assume a centered position when the calyx end is engaged by the ring 150. It is to be noted that because the ring moves over the pear from its calyx end, the engagement of the ring with the pear is at the farthest point from the centering blades for each pear, whether it be long or short, thereby insuring the best centering action on each pear fed to the centering mechanism.

At substantially the time the pear is aligned or centered by the centering blades 131 and the centering ring 150, the corresponding impaling spindle 72 at position A begins its advance (see Fig. 17) toward the pear, by the action of the shuttle block 100 engaging the cam roller on the slide block 75. The spindle 72 will enter the pear before rod 162 rocks the centering ring to release the pear, and continues to advance to the position shown in Fig. 18, after which the centering ring 150 is withdrawn by the same movement of rod 116 which effects the impaling of the pear on the spindle.

At the end of the advance of the impaling spindle, such spindle and the centering blades are rotated from position I and A to positions II and B, and if desired, a portion of the advance of the impaling spindle may occur during this travel, as for example, by the action of the cam plate 80 on the follower roller of the slide block 75 associated with the impaling spindle 72 supporting the pear. It is to be noted also that during the travel of the pair of centering blades from position I to position II, the controlling cam 124 therefor is returned gradually from the position shown in Fig. 15 to that shown in Fig. 14, so that the centering blades remain closed during this travel, and so that the next pair of centering blades approaching position I will be opened as a preliminary to the feeding of another pear to the machine.

As the centering blades and spindle assemblies approach positions II and B, respectively, the pear carried thereby is passed beneath a rapidly revolving circular knife 172 which cuts off a predetermined portion of the stem end of a pear, leaving it entirely supported by the spindle. If desired, the configuration of the cam slot between cam plates 80 and 81 may be such that each spindle assembly is retracted a slight distance just after the end of the pear has been severed by the knife 172, which occurs immediately prior to the assembly reaching position B. This draws the body of the pear out of contact with the revolving knife and avoids any possibility of the latter wrenching the pear out of alignment on the spindle. The knife 172 is secured to a drive shaft 173 operatively connected at one end with the electric motor 20 and journalled at its other end in a bearing 174 carried by the semi-cylindrical centering blade guard 175 (Fig. 1) formed integral with the bracket 54. A safety guard 176 may be provided for shielding the knife 172.

During the advance of a pair of centering blades and an impaling spindle from positions I and A to positions II and B, it is possible that the operator may have failed to release the pear or may have a hand caught in the feed mechanism. To take care of this possibility and to prevent injury to the operator, a safety device is provided for stopping the machine if the operator's hand is carried along with the feeding mechanism. For this purpose, a longitudinally extending shaft 180 (Fig. 1) is journalled at 181 in the gear casing 22 and in a bearing 182 on the bracket 54, and adjacent the feed mechanism is provided with a laterally extending arm 183 (Figs. 1 and 14) having a rod 184 mounted in the bent end thereof parallel to the shaft 180. The rod 184 is positioned above the feed mechanism so as to be contacted by the operator's hand or arm if the hand is caught accidentally in the feed mechanism. Upward movement of the rod 184 will cause oscillation of the shaft 180, so that an arm 185 secured on the opposite end of the shaft will be rocked downwardly. The end of the arm 185 overlies a pin 186 mounted on a pawl 187 (Fig. 2) normally spring urged away from a ratchet 188 on the drive shaft 17. Thus, downward movement of the arm 185 will serve to engage the pawl 187 into engagement with the ratchet to lock the drive shaft, and, thereby, the operating parts of the machine. As previously stated, the clutch is of the self-opening type when overloaded, so that the source of power is automatically disconnected from the drive shaft upon locking thereof.

The next advance of the spindle assembly and its corresponding centering blades from position B and II carries them through another one-third revolution to bring them into position C and III, respectively, as indicated in Figs. 5 and 14. During this movement the centering blades 131, having performed their function, are opened wide by the action of the cam disc 124 so as to clear the pear supported upon the spindle 72, which latter is further advanced by the cam plate 80 during its approach to position C so as to position the stem end of the pear immediately adjacent the end of one of the stemming tubes 30, which is brought into alignment with the spindle at this time by the turret 29 operating in timed relation to the feed mechanism.

During the ensuing period prior to the next rotative movement of the turret 29 and the spindle assemblies, the pear is pushed off the spindle onto the stemming tube 30 aligned therewith by the pusher 85 as previously described.

Operation

The operation of the machine will now be described in connection with the progress of a single pear through the machine, it being understood that the pears will be fed successively to the machine and progress similarly therethrough.

Upon the application of power to the main drive shaft 17, the turret shaft 5 is rotated intermittently one-sixth of a revolution at a time by means of the train of gearing including pinion 18, gear 19, Geneva driver 13 and Geneva gear 12, to carry each stemming tube 30 successively into registration with the transfer station C, then with each peeling unit 31 in turn, then with the splitting, coring and trimming unit, and thereafter back to the loading station, from whence the cycle of movement is continuously repeated during operation of the machine.

The feed mechanism is intermittently operated in unison with the turret 29 through the medium of the turret gear 52, gear 51 and feeder drive shaft 50, whereby at each one-sixth revolution of the turret the feed mechanism is revolved one-third revolution to carry each spindle 72 successively from position A to intermediate position B, then to position C into alignment with a stemming tube 30, and then back to position A for a repetition of the cycle.

During each stationary period of the feeder drive shaft 50 an attendant manually positions the stem end of a pear into the opening provided by the complementary notches 132 of that pair of centering blades 131 at position I, which is directly in line with position A of the spindles 72, at which point the centering ring 150 and the spindle are initially in retracted position.

As the attendant supports the pear in the position described, the shift rod 116 is moved rearwardly to engage the shuttle block 100 with an impaling spindle as well as to withdraw the rod 162 so that movement of the centering ring into engagement over the caylx end of the pear is placed under control of the arm 168 on the rock shaft 140. At the same time rock shaft 140 is operated to close the centering blades so that they shear through the flesh of the pear and engage its stem, as well as to permit the operative movement of the centering ring by spring 164. The action of the centering mechanism thus effects position of the pear properly centered for engagement by the impaling spindle.

During the centering of the pear, the shuttle block 100 is reciprocated by shift rod 116 first rearwardly as described above, so that the spring latch rides over and engages behind the cam roller 84 on the slide block 75 to which the spindle is secured, and then forwardly to advance the spindle into engagement with the blossom end of the pear, which is held by the centering ring so that the spindle engages it centrally of its blossom end. The advance of the spindle is such that it penetrates about half-way or less into the pear as shown in Fig. 18, after which the centering ring is withdrawn.

The pear is now fully supported between the spindle 72 and centering blades 131 and the succeeding rotative movement of the spindle and centering blade assembly carries them in unison through one-third revolution to positions B and II respectively, where they again come to rest. It will be understood, of course, that simultaneously the succeeding spindle and corresponding pair of centering blades are brought into positions A and I, respectively, whereupon the operator presents another pear to the centering blades and the centering ring in the same manner as before. It will be noted that in the retracted position of the centering ring there is sufficient clearance for an impaling spindle to move into its position at A.

During the travel of the centering blades from I to II they are maintained as positioned with the stem between the complementary notches 132, thereby maintaining the position of the pear with its stem axis aligned with the spindle 72. Then, as the parts approach positions B and II, the spindle is advanced by means of the cam plate 80, acting on the cam roller 84 carried by the slide block 75 thereby firmly impaling the pear on the spindle in accurately axially aligned relation. This is accomplished just before the parts reach positions B and II, and at this time the stem end of the pear passes under the revolving knife 172 which cuts a predetermined portion off its stem end and leaving the pear entirely supported by the spindle 72.

The next succeeding rotative movement of the spindle and centering blades carries them to positions C and III, respectively, during which time the spindle is further advanced to position the pear closely adjacent the stemming tube 30, which comes into axial alignment with the spindle at this position, and the centering blades are opened wide so as not to obstruct the transfer of the pear.

When the spindle carrying the pear has come to rest in position C, the latch block 94 is actuated by the movement of the carriage 36 to advance and retract the pusher 85 which, during its advance, shoves the pear off the spindle and impales it on the stemming tube on its stem axis. The retraction of the latch block 94 serves, through the spring strip 94a, to retract the spindle over the guide rod 69, which operates to eject any part of the core left in the spindle.

At the next step the turret is rotated to carry the pear downwardly away from the feeding mechanism and into registration with the first peeling unit, the spindle and centering blades meantime revolving back to positions A and I.

The pear is carried step by step past the various peeling units and into registration with splitting, coring, and trimming unit. While the turret is stationary in this position, the clamp assembly 32 advances and strips the pear from the stemming tube, carrying the pear while holding it in centered position, onto the splitting blade 33 and into operative relation with the coring knife 34 and the butt trimming knife 35, which are rotated to core and trim the pear. Subsequently, the halves of the pear are released, and ejected by suitable means from the machine. As stated previously, these mechanisms are similar to those described in said application, Serial No. 745,252, so that further description herein of their operation is not believed necessary. However, it will be obvious that because of the proper centering of the pears by the feed mechanism, including the centering ring and blades, the pears are presented to the peeling, splitting, trimming and coring knives in the proper position to enhance the operation thereof, and to insure the production of uniform attractive pear halves.

Although the particular embodiment of the invention as described is primarily designed for operating on pears, the invention is not necessarily confined thereto, but may be used either in its entirety or in part, with or without modification, on other fruits as well, without departing from the spirit of the invention. Therefore, I deem myself entitled to all such uses, modifications, or variations as fall within the spirit and scope of the appended claims.

Having now described my invention and in what manner the same may be used, what I claim and desire to protect by Letters Patent is:

1. In a pear preparation machine having pear processing means including a pear impaling member for supporting a pear; feed mechanism for delivering pears in centered relation to said processing means with their stem-blossom axis aligned with said impaling member, including means for engaging and centering the stem end of a pear, means for engaging and centering the calyx end of a pear with reference to the exterior contour thereof, and means for operating said centering means in timed relation to first engage the stem end centering means with a pear and to subsequently engage the calyx end centering means therewith.

2. In a pear preparation machine having pear processing means including a pear impaling member for supporting a pear; feed mechanism for deliving pears in centered relation to said processing means with their stem-blossom axis aligned with said impaling member, including means for engaging and centering the stem end of a pear, means for engaging and centering the calyx end of a pear with reference to the exterior contour thereof, means for impaling and supporting a pear, and means for operating said centering and impaling means in timed relation to first engage the stem end centering means with a pear and to subsequently engage the calyx end centering means therewith, and thereafter to effect impaling of the pear on said impaling and supporting means.

3. In a pear preparation machine having pear processing means; feed mechanism for delivering pears in centered relation to said processing means, including a spindle for impaling and supporting a pear, centering means for engaging and holding the stem of a pear in alignment with said spindle, and ring-like centering means for engaging the exterior contour of the pear at the calyx end thereof to center and hold the calyx end in alignment with said impaling spindle.

4. In a pear preparation machine having pear processing means, feed mechanism for delivering pears in centered relation to said processing means, including an axially reciprocable spindle for impaling and supporting a pear, a pair of centering blades for engaging and holding the stem of a pear in alignment with said impaling spindle, a ring-like centering member for engaging the exterior contour of the pear at the calyx end thereof to center and hold the calyx end in alignment with said impaling spindle, and means for actuating said impaling spindle in timed relation to the centering operation of said blades and said centering member to impale a pear after centering thereof.

5. Centering mechanism for a pear preparation machine comprising means for engaging and holding a pear at the stem end thereof, and a ring-like member for engaging the calyx end of a pear about the calyx thereof to center the pear with reference to the exterior contour of said calyx end.

6. Centering mechanism for a pear preparation machine comprising opposed centering blades for engaging and holding the stem of a pear at the stem end thereof, and a ring-like member for engaging the calyx end of a pear about the calyx thereof to center the pear with reference to the exterior contour of said calyx end.

7. Centering mechanism for a pear preparation machine comprising means for engaging and holding a pear at the stem end thereof, and a ring-like member for engaging the calyx end of a pair about the calyx thereof to center the pear with reference to the exterior contour of said calyx end, said ring-like member having movable pear engaging means mounted about the periphery thereof.

8. Centering mechanism for a pear preparation machine comprising opposed centering blades for engaging and holding the stem of a pear at the stem end thereof, and a ring-like member for engaging the calyx end of a pear about the calyx thereof to center the pear with reference to the exterior contour of said calyx end, said ring-like member having movable pear engaging means mounted about the periphery thereof.

9. Centering mechanism for a pear preparation machine comprising means for engaging and holding a pear at the stem end thereof, and means comprising a series of rotatable rings mounted in planes intersecting a common axis for engaging the exterior of the pear about the calyx end thereof.

10. Centering mechanism for a pear preparation machine comprising opposed centering blades for engaging and holding the stem of a pear at the stem end thereof, and means comprising a series of rotatable rings mounted in planes intersecting a common axis for engaging the exterior of the pear about the calyx end thereof.

11. A feed mechanism for fruit preparation machines comprising centering means for engaging the calyx end of a pear and having rollable fruit contacting surfaces arranged in ring-like array to engage about the calyx of the pear and to provide easy relative movement between the centering means and fruit being centered thereby.

12. Centering mechanism for pear preparation machines comprising a pair of opposed centering blades movable as a unit intermittently through a plurality of positions including a pear feeding position, means for controlling the relatively adjusted position of said blades, said controlling means normally determining separation of said blades at said pear feeding position to permit insertion of the stem end of a pear therebetween, and means for operating said controlling means with said blades at said pear feeding position to cause said blades to shear through the flesh of a pear and grasp the stem thereof.

13. Centering mechanism for pear preparation machines comprising a pear of centering blades mounted for shearing relation and provided with complementary notches cooperable as the blades are closed together to form a centering aperture of varying size for the reception of the stem end of a pear, means mounting said blades for movement as a unit through a plurality of positions including a pear feeding position, means for adjusting said blades to control the size of said centering aperture, said adjusting means normally positioning said blades at said pear feeding position to provide a centering aperture of a size to receive the stem end of a pear, and means for operating said adjusting means with said blades at said pear feeding position to cause said notches to shear through the flesh of a pear operatively associated therewith into centering engagement with the stem of a pear.

14. Centering mechanism for pear preparation machines comprising a pair of centering blades mounted for shearing relation and provided with complementary notches cooperable as the blades are closed together to form a centering aperture of varying size for the reception of the stem end of a pear, means mounting said blades for movement as a unit through a plurality of positions including a pear feeding position, means for adjusting said blades to control the size of said centering aperture, said adjusting means normally positioning said blades at said pear feeding position to provide a centering aperture of a size to receive the stem end of a pear, means for advancing said blades from one position to another, and means for operating said adjusting means with said blades at said pear feeding position to cause said notches to shear through the flesh of a pear operatively associated therewith into centering engagement with the stem of a pear, said operating and adjusting means maintaining said centering engagement during movement of said blades from said pear feeding position to another position.

15. In a feeding device for pear preparation machines, a fruit impaling means, a pair of centering blades arranged in opposed relation to the impaling means and between which the stem end of a pear may be positioned, a ring-like centering member between the blades and the impaling means movable into and out of engagement with the calyx end of a pair having its stem end operatively associated with said blades, and means for causing relative movement between said impaling means and said centering blades and member to impale the fruit onto said impaling means.

16. In a feeding device for pear preparation machines, a fruit impaling means, a pair of centering blades arranged in opposed relation to the impaling means and between which the stem end of a pair may be positioned, a ring-like centering member between the blades and the impaling means movable into and out of engagement with the calyx end of a pear having its stem end operatively associated with said blades, means for operating said centering blades to grasp the stem of a pear positioned therebetween and for operating said centering member to engage the calyx end thereof, and means for thereafter causing relative movement between said impaling means and said centering blades and member to impale the fruit onto said impaling means.

17. In a pear preparation machine having pear processing means; feed mechanism for delivering pears in centered relation to said processing means, including means for centering the stem end of a pear, and centering means arranged in ring-like array and movable into engagement with the calyx end of a pear for centering said calyx end with reference to the exterior contour thereof, and means for impaling the pear while it is in centered position.

18. In a pear preparation machine having pear processing means; feed mechanism for delivering pears in centered relation to said processing means, including means for centering the stem end of a pear, centering means for engagement with the calyx end of a pear for centering said calyx end with reference to the exterior contour thereof, means mounting said calyx end centering means for movement to approach the pear from the calyx end and to provide for pear engaging movement thereof substantially axially of the pear, and means for impaling the pear while it is in centered position.

19. In a pear preparation machine having pear processing means; feed mechanism for delivering pears in centered relation to said processing means, including means for centering the stem end of a pear, centering means having rollable fruit contacting surfaces arranged in ring-like array for engagement with the calyx end of a pear for centering said calyx end with reference to the exterior contour thereof, means mounting said calyx end centering means for movement to approach the pear from the calyx end and to provide for pear engaging movement thereof substantially axially of the pear, and means for impaling the pear while it is in centered position.

20. In a pear preparation machine having pear processing means; feed mechanism for delivering pears in centered relation to said processing means, including means for centering the stem end of a pear, centering means comprising a series of rotatable rings mounted in planes intersecting a common axis for engagement with the calyx end of a pear for centering said calyx end with reference to the exterior contour thereof, means mounting said calyx end centering means for movement to approach the pear from the calyx end and to provide for pear engaging movement thereof substantially axially of the pear, and means for impaling the pear while it is in centered position.

21. In a pear preparation machine having pear processing means; feed mechanism for delivering pears in centered relation to said processing means, including means for centering the stem end of a pair, ring-like means for engagement with the calyx end of a pear for centering said calyx end with reference to the exterior contour thereof, means mounting said calyx end centering means for movement to approach the pear from the calyx end and to provide for pear engaging movement thereof substantially axially of the pear, and means for impaling the pear while it is in centered position.

22. In a pear preparation machine having pear processing means; feed mechanism for delivering pears in centered relation to said processing means, including means for centering the stem end of a pear, ring-like means for engagement with the calyx end of a pear for centering said calyx end with reference to the exterior contour thereof, and means mounting said calyx end centering means for movement to approach the pear from the calyx end and to provide for pear engaging movement thereof substantially axially of the pear.

23. In a pear preparation machine having pear processing means; feed mechanism for delivering pears in centered relation to said processing means, including means for centering the stem end of a pear, ring-like means comprising rollable fruit contacting surfaces for engagement with the calyx end of a pear for centering said calyx end with reference to the exterior contour thereof, and means mounting said calyx end centering means for movement to approach the pear from the calyx end and to provide for pear engaging movement thereof substantially axially of the pear.

24. In a pear preparation machine having pear processing means; feed mechanism for delivering pears in centered relation to said processing means, including means for centering the stem end of a pear, ring-like means comprising a series of rotatable rings mounted in planes intersecting a common axis for engagement with the calyx end of a pear for centering said calyx end with reference to the exterior contour thereof, and means mounting said calyx end centering means for movement to approach the pear from the calyx end and to provide for pear engaging movement thereof substantially axially of the pear.

25. In a pear preparation machine having pear processing means including a pear impaling member for supporting a pear, feed mechanism for delivering pears in centered relation to said impaling member with the longitudinal axis of the pear in alignment with the axis of said impaling member to provide a symmetrical disposition of the pear about said impaling member when impaled thereon, said feed mechanism including a second impaling means, means for engaging and centering the stem end of a pear, and means cooperating with the last named means for engaging and centering the calyx end of the pear with reference to the exterior contour thereof and aligning the longitudinal axis of the pear with the last named impaling means prior to impalement thereon.

26. In a pear preparation machine having pear processing means including a pear impaling member for supporting a pear, feed mechanism for delivering pears in centered relation to said impaling member with the longitudinal axis of the pear in alignment with the axis of said impaling member to provide a symmetrical disposition of the pear about said impaling member when impaled thereon, said feed mechanism including a second impaling member, means for engaging and centering the stem end of a pear with reference to the pear stem, and means cooperating with the last named means for engaging and centering the calyx end of the pear with reference to the exterior contour thereof and aligning the longitudinal axis of the pear with the last named impaling member prior to impalement thereon.

27. In a pear preparation machine having pear processing means including a pear impaling member for supporting a pear, feed mechanism for delivering pears in centered relation to said impaling member with the longitudinal axis of the pear in alignment with the axis of said impaling member to provide a symmetrical disposition of the pear about said impaling member when impaled thereon, said feed mechanism including a second impaling means, means for engaging and centering the stem end of a pear with reference to the pear stem, means cooperating with the last named means for engaging and centering the calyx end of a pear with reference to the exterior contour thereof, and means for operating said second impaling member to impale the pear while it is held in centered relation by said centering means.

ALBERT R. THOMPSON.

CERTIFICATE OF CORRECTION.

Patent No. 2,179,529. November 14, 1939.

ALBERT R. THOMPSON.

It is hereby certified that error appears in the printed specification of the above numbered patent requiring correction as follows: Page 3, second column, line 21, for the word "slit" read split; page 4, second column, line 4, strike out "a" second occurrence; page 8, first column, line 38, claim 2, for "deliving" read delivering; page 9, first column, line 47, and second column, line 50, claims 15 and 21 respectively, for the word "pair" read pear; and that the said Letters Patent should be read with this correction therein that the same may conform to the record of the case in the Patent Office.

Signed and sealed this 20th day of February, A. D. 1940.

(Seal)

Henry Van Arsdale,
Acting Commissioner of Patents.